United States Patent [19]
Umeda et al.

[11] Patent Number: 5,822,115
[45] Date of Patent: Oct. 13, 1998

[54] THIN ADJUSTABLE BINOCULARS

[75] Inventors: Kaoru Umeda, Sennan; Kiyoshi Nishitani; Naoki Ishihara, both of Sakai; Kesaji Sato, Nakano; Muneo Kubota, Suzuka, all of Japan

[73] Assignees: Iiyama-Cosina Co., Ltd., Iiyaama; Minolta Co., Ltd., Osaka, both of Japan

[21] Appl. No.: 925,401

[22] Filed: Sep. 9, 1997

Related U.S. Application Data

[63] Continuation of Ser. No. 600,366, Feb. 13, 1996, abandoned.

[30] Foreign Application Priority Data

Feb. 15, 1995 [JP] Japan .................................. 7-026558
Feb. 15, 1995 [JP] Japan .................................. 7-026559

[51] Int. Cl.⁶ .................................................. G02B 23/18
[52] U.S. Cl. .......................................... 359/412; 359/507
[58] Field of Search ................................... 359/407–418, 359/431, 507, 513

[56] References Cited

U.S. PATENT DOCUMENTS

| | | | |
|---|---|---|---|
| 3,062,098 | 11/1962 | Dowling et al. | 359/412 |
| 3,244,072 | 4/1966 | Dowling et al. | 359/412 |
| 4,986,644 | 1/1991 | Yang | 359/411 |
| 5,604,631 | 2/1997 | Gelardi et al. | 359/411 |

FOREIGN PATENT DOCUMENTS

| | | |
|---|---|---|
| 53-83758 | 7/1978 | Japan . |
| 57-34486 | 7/1982 | Japan . |
| 60-46407 | 10/1985 | Japan . |
| 160935 | 3/1996 | United Kingdom .................... 359/412 |

*Primary Examiner*—Jon W. Henry
*Attorney, Agent, or Firm*—Burns, Doane, Swecker & Mathis, LLP

[57] ABSTRACT

Binoculars having a fixed lens mount, a movable lens mount which is movable straight in a direction as approaching or moving away from the fixed lens mount to adjust their distance to viewer's eyes, a cover member for concealing a space formed between the fixed lens mount and the movable lens mount in accordance with a moving state of the movable lens mount. To the fixed lens mount is attached a first guide engaging with the movable lens mount to slidably guide the movable lens mount as well as a second guide engaging with the cover member so that the cover member is slidable along the second guide together with the movement of the movable lens mount. The binocular further includes a focus adjusting system between both lens mounts to move an objective lens incorporated in each lens mount in a direction of an optical axis, and an erect prism unit including a roof prism in each lens mount. The each roof prism is arranged inner side of respective lens mount so that an inclined cutting portion thereof faces each other. A guide shaft for guiding the object lens in a direction of the optical axis is provided within a space formed in the vicinity of the inclined cutting portion of the roof prism.

20 Claims, 12 Drawing Sheets

F I G. 9 (A)
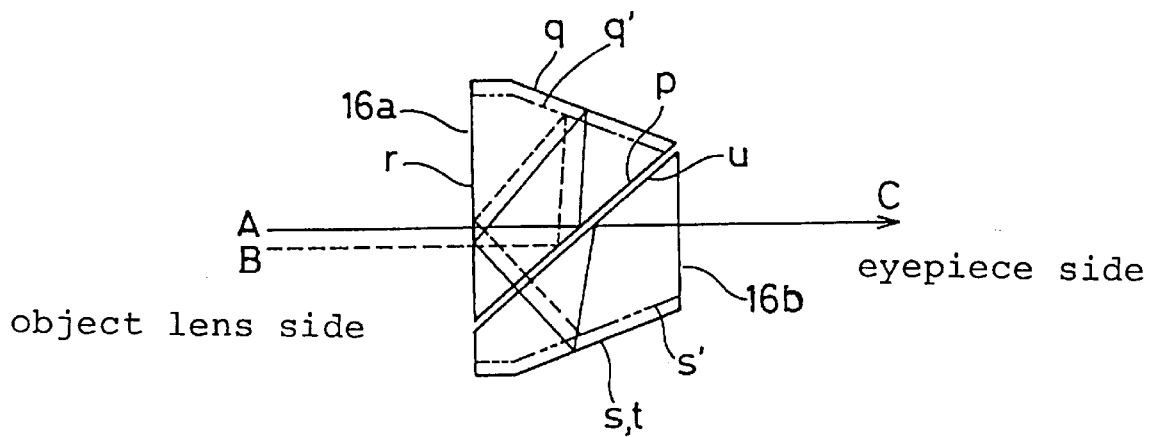
F I G. 9 (B)
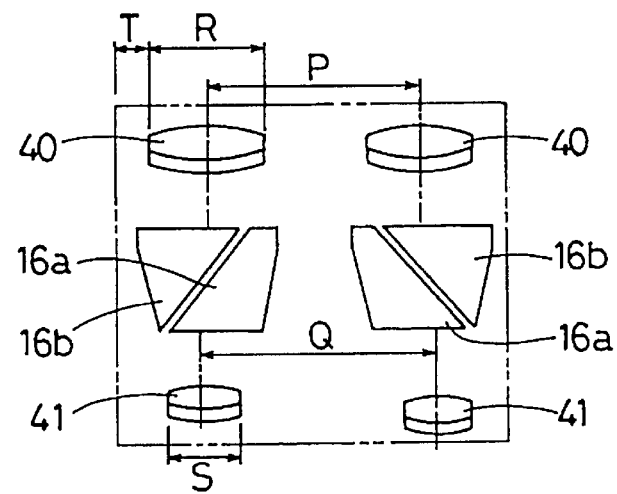

F I G. 1 5 (A)
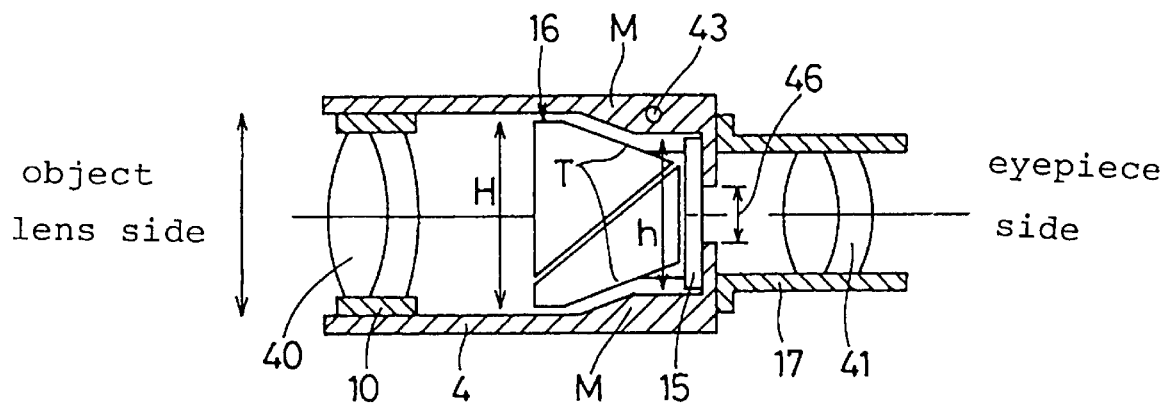
F I G. 1 5 (B)
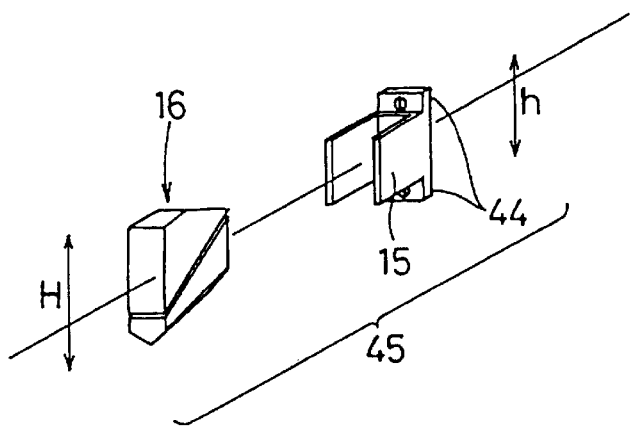

F I G. 1 6 (A)
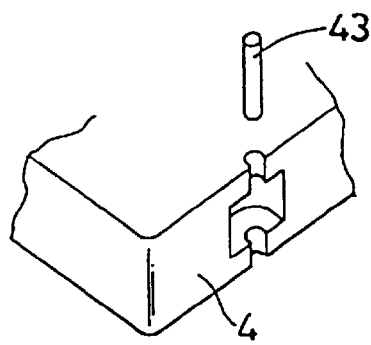
F I G. 1 6 (B)
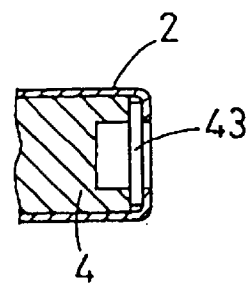
F I G. 1 6 (C)
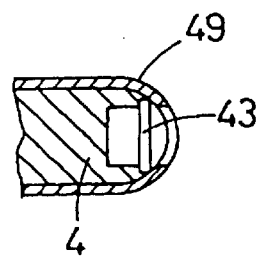
F I G. 1 6 (D)
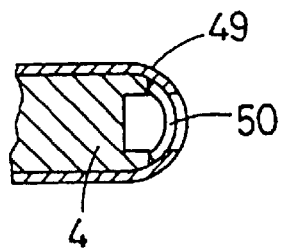
F I G. 1 6 (E)
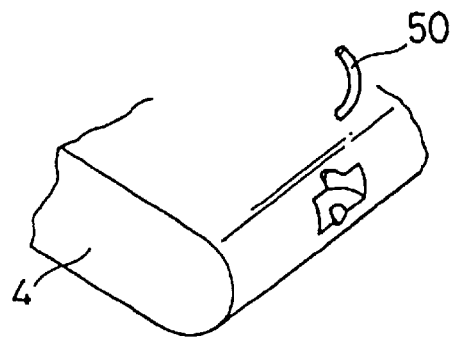

THIN ADJUSTABLE BINOCULARS

This application is a continuation of application Ser. No. 08/600,366 filed Feb. 13, 1996 now abandoned.

BACKGROUND OF THE INVENTION

1. Field of the Invention

The present invention pertains to horizontally adjustable binoculars having a variable exterior configuration in which their total volume changes between when the lens mounts are placed close together and when they are pulled apart, and more particularly to compact binoculars that are simple in configuration and highly portable while maintaining a high degree of optical accuracy.

2. Description of the Related Art

Representative examples of conventional binoculars include a foldable model having a rotational axis between the left and right lens mounts in which the positions of the left and right lens mounts are adjusted to the viewer's eyes by rotating them within certain angles around the rotational axis that works as the axis of the rotation, or in other words, by folding the binoculars in two at the rotational axis shaft such that the left and right lens mounts can come closer to each other, as well as a horizontally adjustable model that comprises a box body housing the left and right lens mounts so that the positions of the left and right lens mounts are adjusted to the eyes by sliding them laterally.

As to the former foldable model binoculars, many products having compact configurations have been put to practical use. However, they have limitations in making the binoculars compact, and particularly, thin, in that only round lenses may be used since the left and right lens mounts change their positions within certain angles around the rotational axis when they are adjusted to the viewer's eyes.

On the other hand, in the case of the latter conventional horizontally adjustable binoculars, because everything necessary to construct the binoculars, such as the optical systems and the lens mount position adjustment mechanism, is assembled in the box body, the exterior configuration cannot help become large in size. Japanese Laid-Open Patent Sho 60-46407, for example, discloses a construction in which an exterior body houses the left and right lens mounts. Using such a construction, the exterior size remains large even when the binoculars are not in use, or in other words, when the lens mounts are placed close together. In the case of this prior art, the overall size may be made smaller if two exterior bodies are moved relative to one another, but this would increase the number of components.

As a model in which improvements are made to deal with these problems, Japanese Laid-Open Utility Model Sho 57-34486 and Japanese Laid-Open Patent Sho 53-83758, for example, disclose a model in which there are two shafts that work as guide members and are attached to the central body unit, and in which housing units and the left and right lens mounts are movably attached to these shafts so that the positions of the lens mounts may be adjusted to the viewer's eyes by lateral movement of the housing units and the lens mounts formed as integral units.

In said improved version of the conventional model, although the construction allows the binoculars to be compact, and in particular, thin, neither of the disclosures indicates a specific construction for making the binoculars thinner. In addition, if it is desired to obtain sufficient stability, etc. of the optical axes of the left and right lens mounts when external force is applied to the binoculars to adjust them to the viewer's eyes, said model is much more limited in terms of construction than the foldable model, and there are various difficulties in realizing thinness given so many structural limitations. Furthermore, there are currently no disclosures that indicate specifically how the internal mechanisms should appear and how the space created after the lens mounts are moved should be concealed.

Moreover, while binoculars in which roof prisms such as Schmidt prisms are used are known as binoculars of this type, no prior art specifies in which direction the roof prisms should face, and so their placement is determined in accordance with the construction. In any case, no attempt has been made to obtain an arrangement and configuration of the prisms relative to the arrangement of other components aimed at overall compactness.

OBJECTS AND SUMMARY

The main object of the present invention is to provide horizontally adjustable binoculars that are thinner than various other examples of the prior art.

Another object of the present invention is to provide horizontally adjustable binoculars having increased solidity and improved design in comparison with various other examples of the prior art.

Yet another object of the present invention is to provide horizontally adjustable binoculars in which increased thinness and solidity and improved design may be realized by placing the guides for the movement of the object lenses along the optical axes close to the lens drive means.

These and other objects of the present invention are accomplished by binoculars comprising a fixed lens mount, a first guide attached to said fixed lens mount, a second guide attached to said fixed lens mount, a movable lens mount movable straight with a guidance of said first guide in such a direction as approaching or moving away from said fixed lens mount and a cover member for concealing a space formed between said fixed lens mount and movable lens mount in accordance with a moving state of said movable lens mount, said cover member being movable with a guidance of said second guide together with said movable lens mount.

These and other objects of the present invention are also accomplished by binoculars comprising a pair of lens mounts an object lens holder provided in each lens mount to hold an objective lens therein, a focusing system provided between said lens mounts for focusing by moving each object lens holder in a direction of an optical axis, an erect prism unit provided in each lens mount and including a roof prism and a guide shaft for guiding said object lens holder in a direction of the optical axis, the guide shaft being provided within a space formed in the vicinity of an inclined cutting portion of the roof prism These and other objects, advantages and features of the invention will become apparent from the following description thereof taken in conjunction with the accompanying drawings which illustrate specific embodiments of the invention.

BRIEF DESCRIPTION OF THE DRAWINGS

In he following description, like parts are designated by like reference numbers throughout the several drawings.

FIGS. 1(A), 1(B) and 1(C) are perspective illustrations showing the binoculars when the lens mounts are placed close together, when the lens mounts have been moved apart from each other and when the lens mounts are apart from each other as in FIG. 1(B) but are seen from the eyepiece side, respectively.

FIG. 9 shows the construction of an erect prism; FIG. 9(A) is a side elevation and FIG. 9(B) is an illustration showing the arrangement of prisms in the left and right lens mounts.

FIG. 15 shows the right lens mount; FIG. 15(A) is a cross-sectional view and FIG. 15(B) a perspective illustration of important parts, in which the components are separated from one another.

FIG. 16 shows the construction of a suspender member; FIG. 16(A) is a perspective illustration of important parts showing the construction of a public domain model, FIG. 16(B) is a cross-sectional view showing important parts of said model, FIG. 16(C) is a cross-sectional view of important parts showing an inconvenient situation in which the public-domain construction is used with a curved cover, FIG. 16(D) is a cross-sectional view showing important parts of a construction suitable to the curved cover, FIG. 16(E) is a perspective illustration of important parts of said construction.

FIG. 18(A) shows a condition in which the lens mounts are placed close together; FIG. 18(B) shows a condition in which the lens mounts are set apart, 18(C) is a perspective illustration showing the condition shown in FIG. 18(B) as seen from the eyepiece side, FIG. 18(D) is an enlargement of the graduations.

DETAILED DESCRIPTION OF THE PREFERRED EMBODIMENTS

Figure 1:
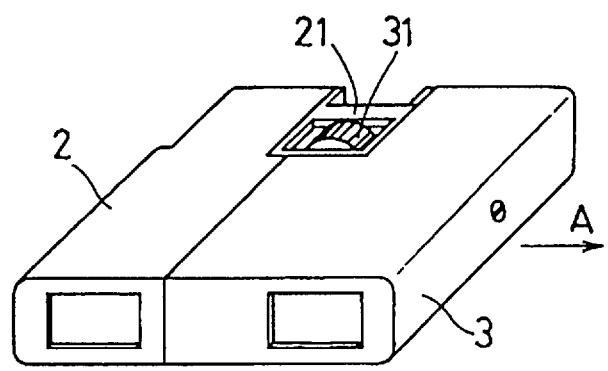
FIG. 1 shows an external view of the binoculars pertaining to an embodiment of the present invention.
Figure 1:
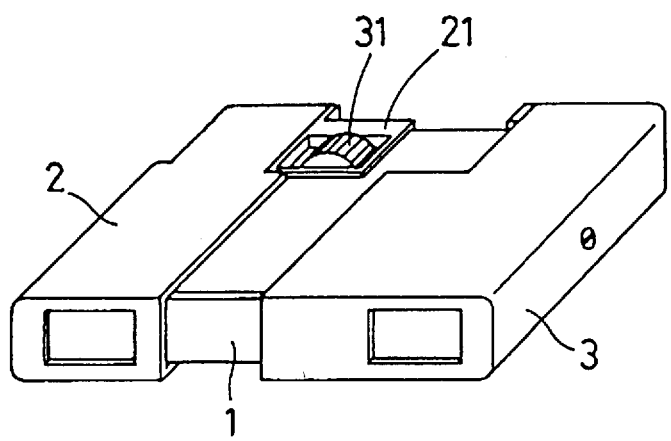
Figure 1:
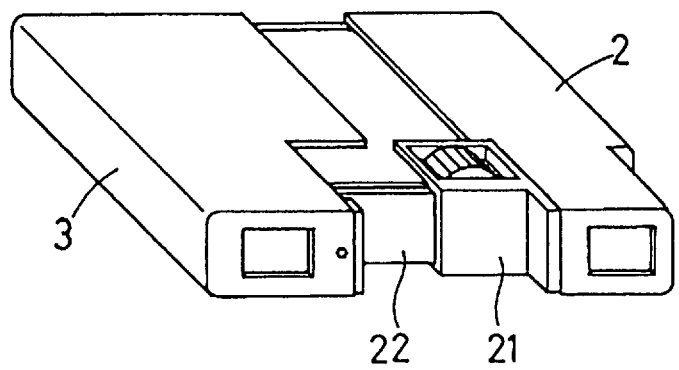
Figure 2:
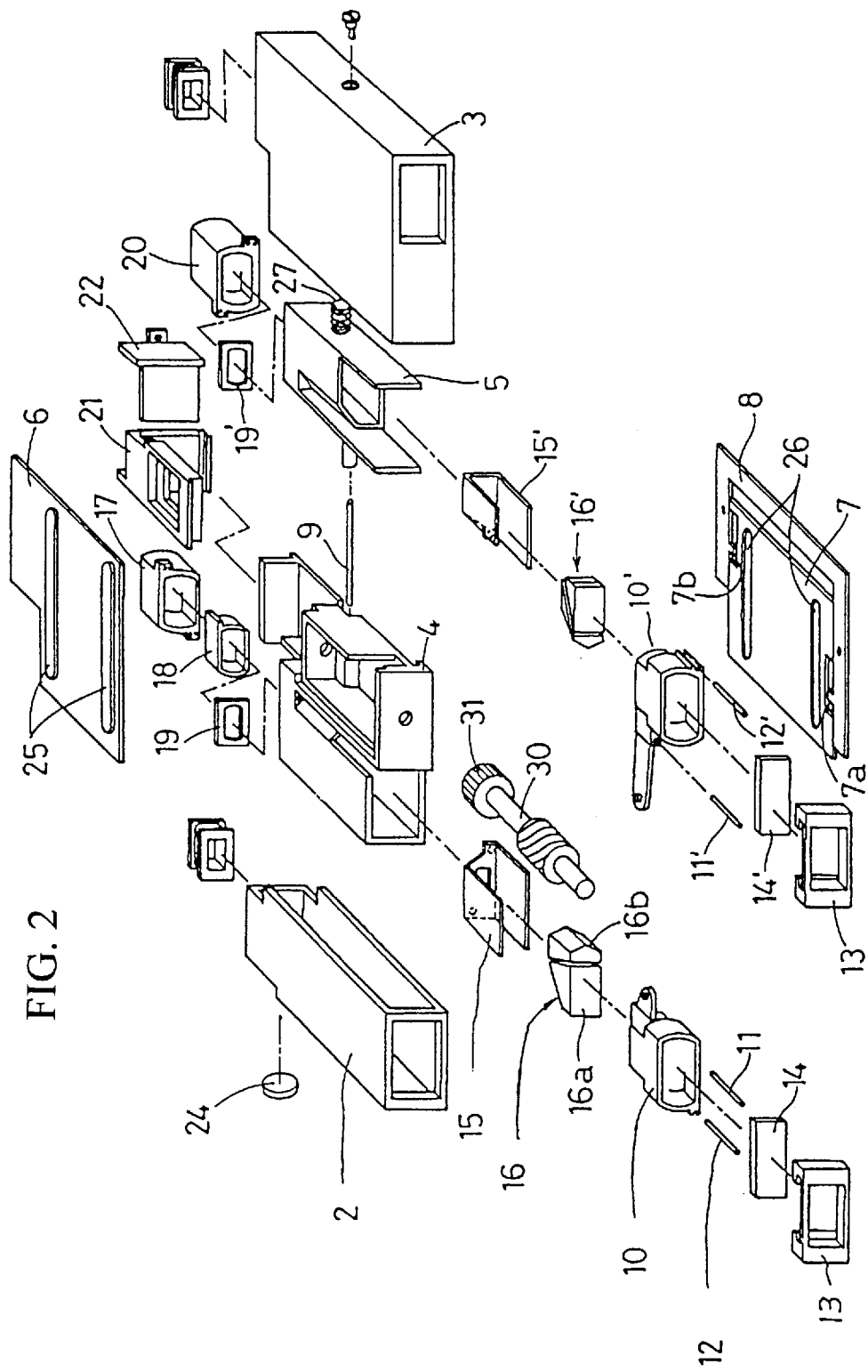
FIG. 2 is a perspective illustration showing disassembled components of the binoculars.
Figure 3:
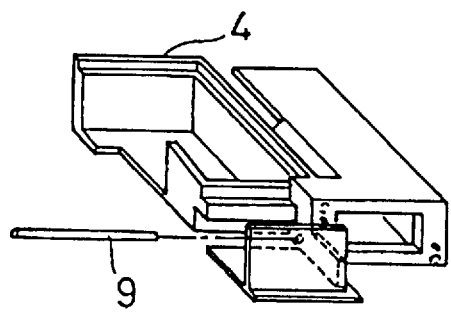
FIG. 3 is a perspective illustration showing a rear view of a fixed body and a guide shaft.
Figure 4:
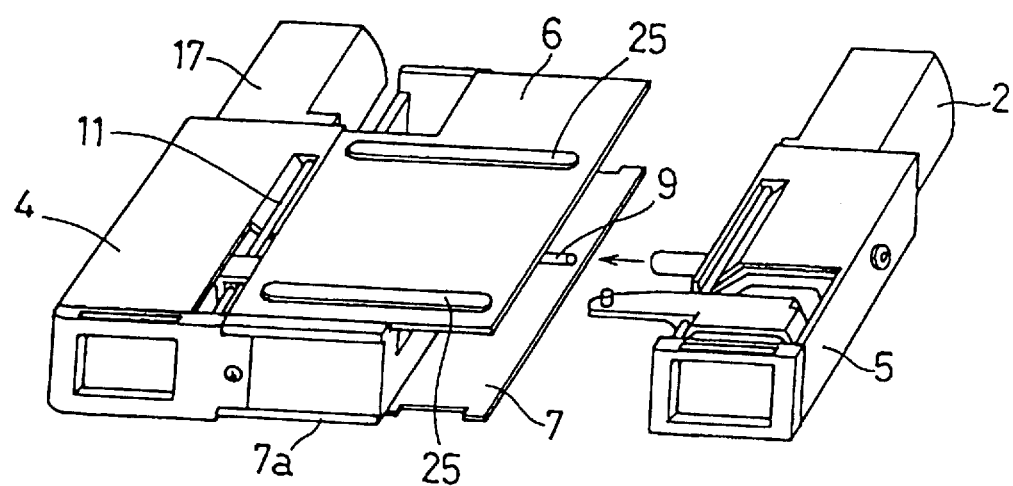
FIG. 4 is a perspective illustration showing the binoculars in the assembled condition shown in FIG. 1 but with the right and left covers removed.
Figure 5:
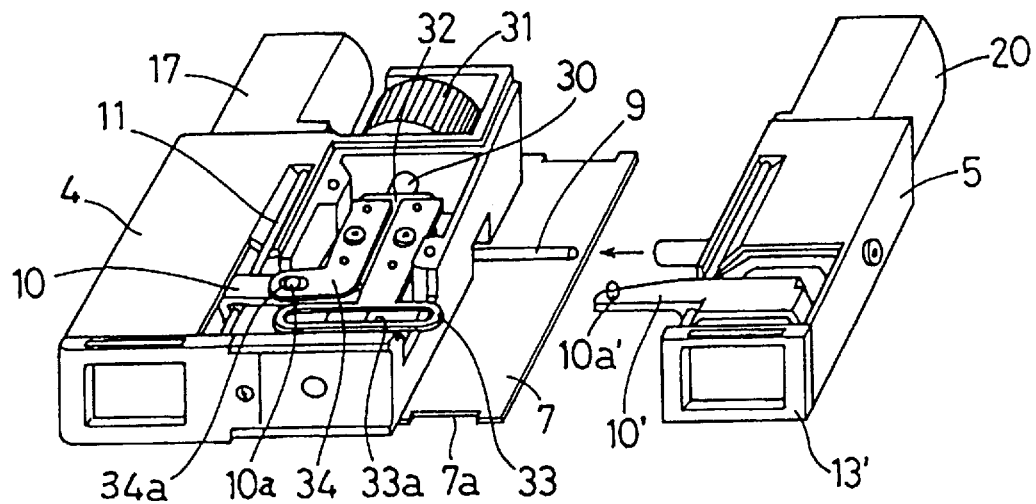
FIG. 5 is a perspective illustration showing the internal focus adjustment mechanism, with the top board removed from the partially disassembled condition shown in FIG. 4.

An embodiment of binoculars of the present invention is explained below with reference to the drawings. FIG. 1 shows an external view of the binoculars of this embodiment. FIG. 1(A) shows the binoculars with the lens mounts placed close together, FIG. 1(B) shows the binoculars with the lens mounts pulled apart by pulling left cover 3 in the direction indicated by arrow A, and FIG. 1(C) shows the binoculars in the condition shown in FIG. 1(B) as seen from the eyepiece side. FIG. 2 shows the components of the binoculars, in which the components are separated from one another. FIG. 3 shows fixed body 4 and guide shaft 9 as seen from the rear. FIG. 4 shows the binoculars in the assembled condition as shown in FIG. 1 but with right cover 2 and left cover 3 removed. FIG. 5 shows the binoculars in a partially disassembled condition as in FIG. 4 but with top board 6 also removed so that the internal focus adjustment mechanism is shown.

First, to explain the overall construction of the binoculars, fixed body 4 shown in the disassembled configuration in FIG. 2 houses right object lens holder 10, a prism unit comprising prism holder 15 and erect prism 16, an optical system including an eyepiece unit comprising eyepiece holder 17 and eyepiece movable holder 18, as well as a focus adjustment unit including, as shown in the focus adjustment mechanism illustration of FIG. 5, focus adjustment shaft 30, adjustment knob 31, nut 32, right adjustment board 34, left adjustment board 33, etc. Said right cover 2 is also fixed to fixed body 4.

On the other side of said focus adjustment unit, opposite the right optical system, is present a left movable lens mount comprising movable body 5, left object lens holder 10', prism units 15' and 16', eyepiece unit 20, etc. This left movable lens mount is movably engaged with guide shaft 9 fixed to fixed body 4, and left cover 3 is also movably attached to movable body 5.

Figure 17:
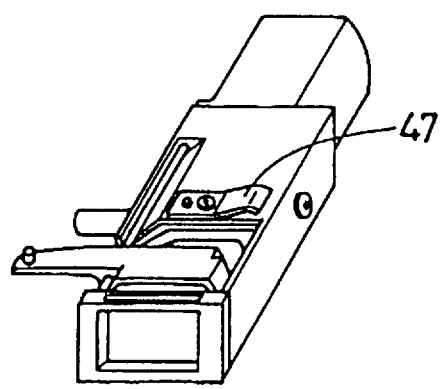
FIG. 17 is a perspective illustration of important parts showing the position of a movable lens mount pressing spring.
Figure 18:
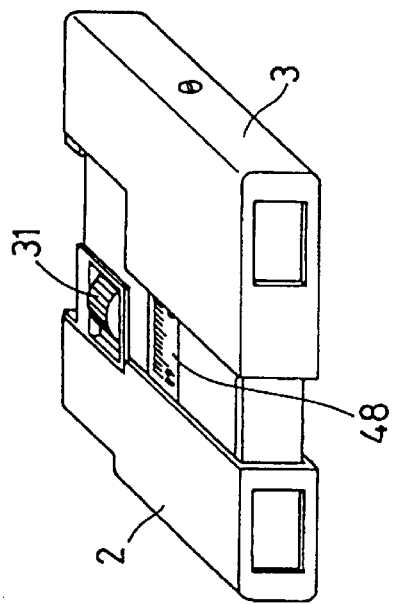
FIG. 18 shows graduations regarding the distance between the lens mounts.
Figure 18:
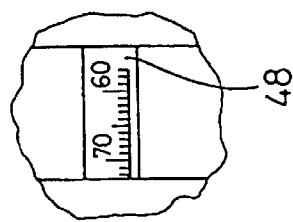
Figure 18:
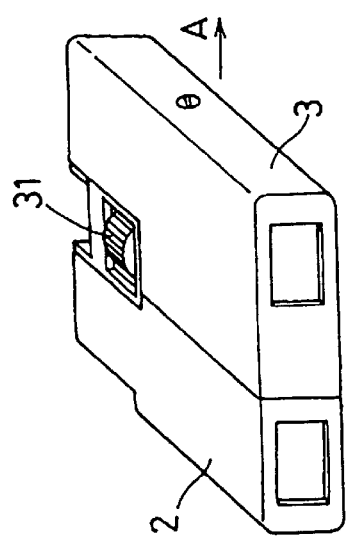
Figure 18:
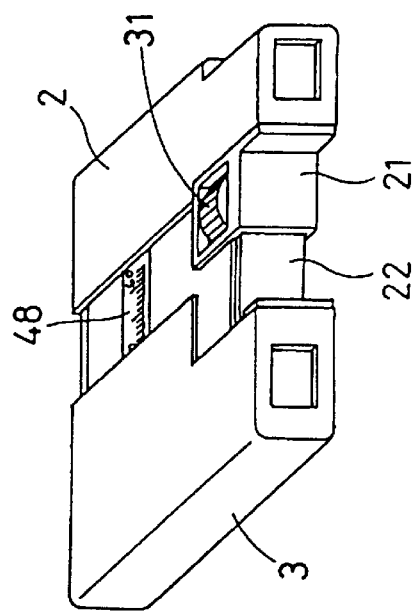

As shown in FIG. 4, top board 6 and bottom board 7 that extend toward movable body 5 are fixed to the top and bottom of fixed body 4 such that they sandwich the left movable lens mount on its top and bottom. As shown in FIG. 17, spring 47 located on the left movable lens mount presses said movable lens mount toward bottom board 7, and this spring 47 comprises, together with guide shaft 9, a lens mount position adjustment mechanism. Incidentally, it is possible to place this spring 47 on the side of top board 6. In this case, however, when the movable lens mount 5 is moved, the location at which the spring exerts pressure changes depending on the distance between the lens mounts, and the varying deformation of movable lens mount 5 may lead to an unstable optical axis. Therefore, this location is not appropriate.

A prior art is generally known in which two guide bars are located in the vicinities of the eyepiece and the object lens. However, since the present invention particularly aims to make the binoculars thin, eyepiece side guide shaft 9 is located in the vicinities of view field masks 19 and 19' on which the light rays are made to converge most, while the object lens side guide means is arranged to make movable body 5 movable in contact with bottom board 7 due to the nature as a rotation preventing means, thereby freedom in the design of the optical systems is increased.

Operation of the focus adjustment mechanism is performed by moving object lenses 40 of the right fixed lens mount and the left movable lens mount and object lens holders 10 and 10' that hold said object lenses, along the optical axes. The construction for this focus adjustment is as follows. As shown in FIG. 5, pin 10a is located at the end of one arm of right object lens holder 10, and this pin 10a is movably inserted in long hole 34a of right adjustment board 34. Similarly, pin 10a' is located at the end of one arm of left object lens holder 10', and it is also movably inserted in long hole 33a of left adjustment board 33.

When adjustment knob 31 is turned, focus adjustment shaft 30, which is formed as one integral unit with said knob, also rotates, and nut 32 move straight along the optical axes. To nut 32 are fixed left and right adjustment boards 33 and 34, with which pins 10a and 10a' of object lens holders 10 and 10' are engaged respectively, and when adjustment knob 31 is turned, left and right object lens holders 10 and 10' move along the optical axes, thereby focus adjustment is accomplished.

Figure 6:
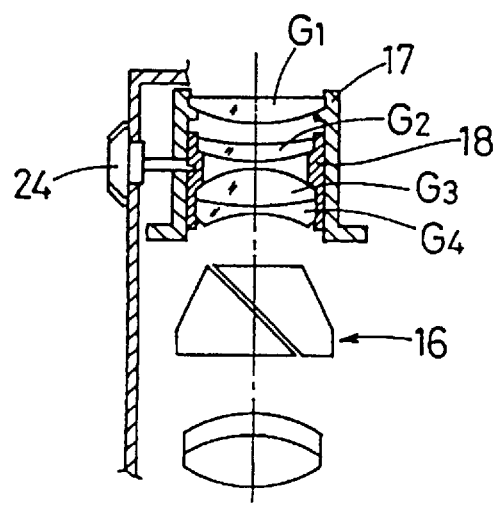
FIG. 6 is a cross-sectional view showing important parts of a diopter adjustment mechanism.

FIG. 6 shows a diopter adjustment mechanism. Diopter adjustment is performed by turning diopter adjustment knob 24 which is held on a side of right cover 2 by a shaft perpendicular to the optical axis. Eyepiece holder 17 is screwed in fixed body 4 and movable eyepiece holder 18 holding lenses G2, G3 and G4 as one unit is mounted inside this eyepiece holder 17 such that said movable eyepiece holder may move along the optical axis.

When diopter adjustment knob 24 is turned, movable eyepiece holder 18 moves along a straight path by means of a rotation-straight movement conversion mechanism (not shown in the drawing) comprising an eccentric shaft, etc. Lens G1 located farthest to the outside has a flat outer surface. This lens G1 is fixed to eyepiece holder 17 and protects the inner lens group including G2, G3 and G4. In addition, protective glass 14 (14') that prevents the invasion of dust, etc. is held by glass holder 13 (13') on the object lens side.

Incidentally, as described below, since left cover 3 adopts a construction in which the internal optical components and the housing cover are not completely fixed together and are floating apart from each other, i.e., a 'floating' construction, in order to stabilize the optical axis, it is advantageous to locate the diopter adjustment mechanism, etc. which are operated from the outside, on the fixed body.

Rails 25, which protrude slightly upward, are located on top board 6, and rails 26, which protrude slightly downward, are located on bottom board 7. These rails 25 and 26 constitute the top and bottom guides for the movement of left cover 3.

Notches 7a and 7b are located on bottom board 7 in the front and in the back. The claws of stopper lever 8 fixed to left cover 3 engage with these notches 7a and 7b, constituting a stopper for left cover 3 when it is pulled out. The end of bottom board 7 and the end of stopper lever 8 are in close contact with each other without a backlash, such that they serve as guides for the lateral movement of left cover 3.

Figure 7:
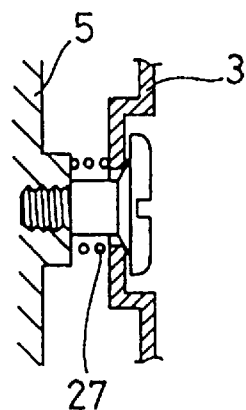
FIG. 7 is an enlarged cross-sectional view of important parts showing the connection between the left cover and the movable body.

Left cover 3 moves with top and bottom boards 6 and 7 as its guides. Movable body 5, including the optical system, moves with guide shaft 9 as its guide. In this case, in order to prevent excessive restraint, a 'floating' construction is employed for left cover 3 and movable body 5, in which there is a slight gap in the connection between left cover 3 and movable body 5, as shown in FIG. 7, so that there is some backlash, or in which a certain range of free movement may be allowed via spring 27.

Movable body 5 has a construction such that a stable optical axis may be obtained by means of guide shaft 9 and such that externally applied force may be absorbed by left cover 3 and top and bottom boards 6 and 7 so that its influence on the optical axis is eliminated to the maximum degree.

In such a construction as the binoculars of this embodiment, in which the total volume of the binoculars as a whole changes between when the lens mounts are placed close together and when they are pulled apart, a means to hide the space that appears between the left and right lens mounts when they have been pulled apart becomes an issue. In this embodiment, such a space that appears after said movement is hidden by the left optical system by having left cover 3 be larger than right cover 2 and by moving the larger left cover 3, as shown in FIG. 1.

The eyepiece side has the following construction, from the perspective of design limitations and convenience of use. As shown in FIGS. 1(*a*) through 1(*c*), when the lens mounts are placed close together, adjustment knob 31 is positioned approximately in the middle of the binoculars as a whole and when the lens mounts are pulled apart, adjustment knob 31 remains in the same position and only left cover 3 slides.

On this occasion, barrier 22 integrally attached to left cover 3 covers the space after the left optical system moves. Barrier 22 is protected by knob cover 21 and top and bottom boards 6 and 7 so that there will be no problem if external force is directly applied to said barrier. Knob cover 21 has a more concave configuration than the left and right cover 2 and 3 surfaces that come into contact with the eyes, so that left and right covers 2 and 3 will not interfere with the nose when the user holds the binoculars to the face. The concave configuration is maintained as left cover 3 is opened.

As shown in FIGS. 18(A) through 18(D), as the lens mounts are pulled apart from the position at which they are placed close together, graduations 48 indicating the distance between the eyes appears. By having one end of left cover 3 meet any desired graduation, the best distance between the eyepieces is obtained without looking into the binoculars for confirmation. Therefore, observation using the binoculars may be begun right away.

The construction to make the binoculars compact will now be explained in detail. In explaining the construction to make roof prism binoculars compact, to describe the optical systems first, the right optical system of the binoculars comprises three elements: object lens 40 to form the object image on the focal point, erect prism 16 that causes the image, which is upside down when formed by object lens 40, to stand right side up, and eyepiece 41 that enlarges the image made by object lens 40. The left lens mount has a similar construction. Components that are equivalent to those of the right lens mount are given the same numbers with apostrophes. As a means to make the binoculars as a whole compact and thin, generally one possible way is to make the effective diameter of the object lens small, but this would create binoculars having a dark field of view. Therefore, in this embodiment, oval-shaped lenses obtained by cutting off the tops and bottoms of round lenses along straight lines are used for object lens 40. In response, erect prisms 16 are also vertically thin and oval-shaped lenses are used for eyepieces 41. In this embodiment, Schmidt prisms are used for erect prisms 16.

The configuration of erect prisms 16, which are vital in achieving compactness and thinness, will now be explained. The means to make prism 16 small along a lateral direction will be explained first with reference to FIG. 9. As shown in FIG. 9(A), erect prism 16 comprising a Schmidt prism is composed of auxiliary prism 16a and roof prism 16b.

The light entering through object lens 40 is reflected three times in auxiliary prism 16a, i.e., on surface p, surface q and surface r, and twice in roof prism 16b, i.e., on surfaces s and t and surface u (once in the vertical direction by roof surfaces s and t), after which it moves on to eyepiece 41. Since the width of erect prism 16 is determined by the distance between reflective surface q and reflective surface s, having these two reflective surfaces q and s be as close as possible leads directly to compactness.

Reflective surfaces q and s may be brought close to one another, or in other words moved inward, by having the point at which the light enters and the point at which the light exits erect prism 16 not align along a straight line. Solid line A in FIG. 9(A) indicates the optical path in which the light's entry and departure points are aligned along a straight line, and dotted line B indicates the optical path in which the light's entry and departure points are not aligned along a straight line. By moving entering light from solid line A to dotted line B, reflective surface q can be moved inward to q' and reflective surface s can also be moved inward to s'. In this case, the point at which departing light C exits the prism does not change. Needless to say, entering light A can only be moved in the direction of dotted line B, relative to departing light C: if it were moved in the opposite direction, the prism would become larger.

By placing erect prisms 16, as to which thinness is achieved in the above manner, such that the distance between the optical axes of the two prisms is larger on the side of the eyepiece than the distance between the optical axes on the side of the object lens, while the relationship between distance P between left and right object lens holders and distance Q between eyepiece holders is P<Q, some room is created between object lens holders 10 and 10' and the outer covers, and the distance for sliding from the state in which the lens mounts are placed close together to the state in which the lens mounts are pulled furthest apart is reduced. This is advantageous both in terms of strength and in that it hides an unsightly aspect.

Regarding the vertical thickness of erect prism 16, the effective vertical diameter may be reduced by having object lens 40 be in an oval configuration, as described above, and thinness can be promoted to that extent. In this embodiment, compactness is further achieved by having roof prism 16b be thinner than auxiliary prism 16a.

Figure 8:
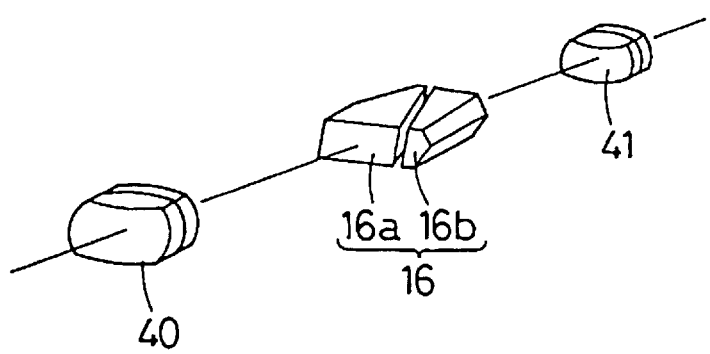
FIG. 8 is a perspective illustration showing the optical system in a simplified fashion.
Figure 10:
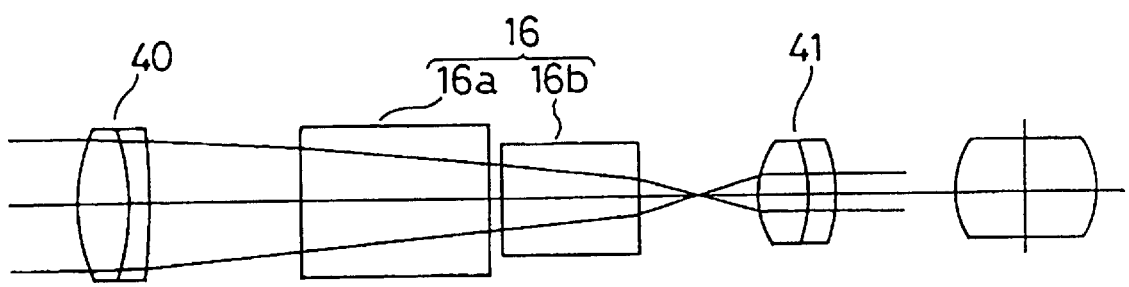
FIG. 10 is a development of the prism shown in FIG. 8.

In other words, as is clear from FIG. 10 which expands the prism shown in FIG. 8, the light rays are made to converge by object lens 40. Therefore, the effective width of roof prism 16b, which the incident light enters after first entering auxiliary prism 16a, may be made smaller than the effective width of auxiliary prism 16a, which enables the prism to be thin. Needless to say, it is necessary to consider not only the light in the optical axis but also the light outside the optical axis (not shown in the drawing) in order to reduce the vertical as well as lateral dimensions of the prism.

In this embodiment, since the fixing member of prism holder 15 is located on the light exit side of erect prism 16, as shown in FIG. 2, the arms of prism holder 15 may be made thick to the extent that roof prism 16b is made thin, thereby adding increased strength.

Figure 11:
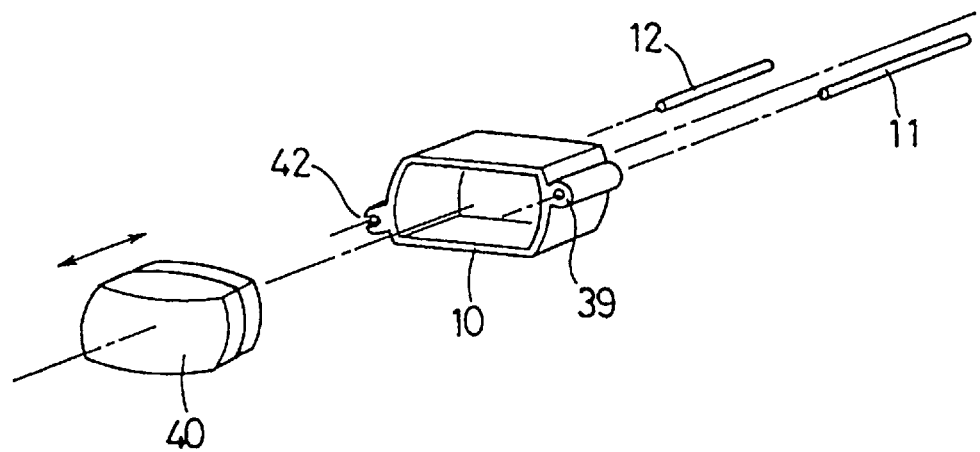
FIG. 11 is a perspective illustration showing an object lens and a lens holder in which each member is separated.

In addition, in order to make the binoculars thin it is necessary not only to make design efforts in connection with said optical system but also to make the mechanisms around it thin. Lens holder 10 holding the oval lens will be explained in connection with this point. FIG. 11 shows oval object lens 40 and lens holder 10 holding said object lens. Object lens 40 must be moved along the optical axis in order to bring the binoculars into focus.

Figure 12:
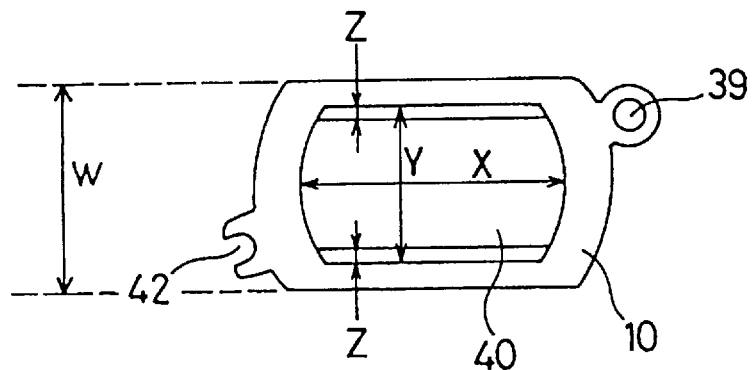
FIG. 12 is a front elevation showing the object lens and the lens holder, in which said members are assembled.

In this embodiment, the object lens holder is moved with the assistance of a guide shaft (here, guide shaft 11 and rotation prevention shaft 12 are used). Lens holder 10 has guide hole 39 and U-groove 42 in which shafts 11 and 12 are placed, respectively. The positions of these guide shafts 11 and 12, guide hole 39 and U-groove 42 should be within the height of oval object lens 40. In other words, the binoculars as a whole are made thin by placing the guide shafts within vertical width W shown in FIG. 12.

To explain the relationship between oval object lens 40 and lens holder 10, while oval lens 40 can be processed with accuracy relatively easily with regard to diameter size X, accuracy is not so easily achieved regarding lens width size Y. As a result, it is necessary to determine the positioning of object lens 40 and lens holder 10 using the curved surfaces on both ends of diameter X. In other words, object lens 40 and lens holder 10 must be brought into contact at the curved surfaces on both ends and gaps Z must be created above and below oval object lens 40.

Figure 13:
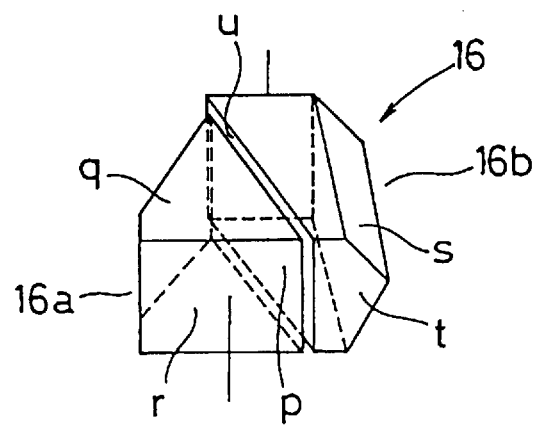
FIG. 13 is a perspective illustration showing the erect prism.

Further, in the case of Schmidt prism used in this embodiment, as shown in FIG. 13, an image is formed after having the light be reflected in lateral directions a total of five times by reflective surfaces p, q and r of auxiliary prism 16a and reflective surfaces s and t and surface u of roof prism 16b, in order to make an upright image. On the other hand, in the vertical directions, an upright image is formed by having the light be reflected once by roof surface s and t of roof prism 16b. These roof surfaces s and t are precisely perpendicular to each other.

Figure 14:
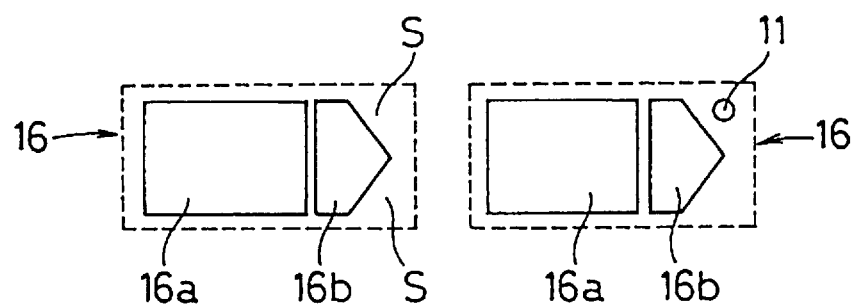
FIG. 14 shows the arrangement of the erect prisms.

Since roof prism 16b has these roof surfaces s and t that are perpendicular to each other, space S is created in two areas above and below the roof surfaces as shown in FIG. 14. In this embodiment, space S created above and below the roof surfaces is effectively utilized by having guide shaft 11 described above for the movement of the object lens traverse this space S. This helps to make the binoculars as a whole compact and thin.

While guide shaft 11 traverses space S in this embodiment, the binoculars are not limited to this construction. Any component of the binoculars may be placed in this space S.

Erect prism 16 comprising a Schmidt prism is located such that the wider side faces the object lens and the narrower side faces the eyepiece, as shown in FIGS. 15(A) and 15(B). Since erect prism 16 is located in this way, the binoculars as a whole may be made compact by having a construction in which erect prism 16 is placed inside fixed body 4 from the object lens side.

This pertains to flange 44 that is formed on prism holder 15 to fix the prism on fixed body 4. Schmidt prism 16 comprises auxiliary prism 16a and roof prism 16b as described above. Prism holder 15 therefore is required in order to hold these two prisms 16a and 16b together as one unit. Prism holder 15 has flange 44 in order to attach itself to fixed body 4.

It is also necessary to make this flange 44 as thin as possible when it is formed on prism holder 15 in order to help make the binoculars as a whole compact. The unit comprising such prism holder 15 as well as auxiliary prism 16a and roof prism 16b formed into one unit is hereinafter called prism block 45, to pay attention to width H on the object lens side and width h on the eyepiece side.

In a case where prism block 45 is assembled into fixed body 4 from the eyepiece side, for example, fixed body 4 must have an opening larger than width H on the eyepiece side. Width h must then be inevitably made larger than the above-mentioned size so that prism block 45 may be located in fixed body 4 on the eyepiece side, which in turn would increase the size of the binoculars as a whole. In addition, since fixed body 4 must have an opening larger than width H on the eyepiece side, it also would reduce the strength of fixed body 4.

In light of the above discussion, this embodiment employs a construction in which prism block 45 is located in fixed body 4 from the object lens side. In this case, since fixed body 4 requires only an opening as large as width h on the eyepiece side, compactness can be maintained. Further, hole 46 formed on the eyepiece side of fixed body 4 need not be larger than the optically effective range and fixed body 4 can extend to fill space S created by slanting sides T of Schmidt prism 16, and as a result fixed body 4 can have sufficient strength.

In this embodiment, the space is effectively utilized to achieve compactness by forming suspender shaft 43 in part M that fills out the space created by the slanting sides of the prism. Although this part M is used for suspender shaft 43 in this embodiment, the construction is not limited to this, and it is also acceptable to use part M for any other components of the binoculars. Additionally, since part M occurs in either fixed body 4 or movable body 5, either may be used.

However, this embodiment is characterized in that part M of fixed body 4, which has less influence in terms of variation of the optical axis, is used to locate a component such as suspender shaft 43 to which external force is applied. FIG. 16 shows the construction of the suspender member. As shown in FIGS. 16(A) and 16(B), a public domain method in which suspender shaft 43 is inserted in fixed body 4 and is prevented by right cover 2 from falling out of the body is used in this embodiment.

Incidentally, the construction of the suspender member as described above is applied to the housing cover (right cover) having a curved surface as cover 49 shown in FIG. 16(c), the location of suspender shaft 43 becomes too deep from the cover, making it difficult to insert a strap (not shown in the drawing), as shown in FIG. 16(C). Therefore, as shown in FIGS. 16(D) and 16(E), the inconvenience described above can be eliminated by using pin 50 which has a configuration approximately matching the curve of the inner surface of cover 49.

Needless to say, since opening T on the object lens side of fixed body 4 must be wide enough to house object lens holder 10, which means that it must be equal to or larger than width H, the binoculars do not become large by placing prism block 45 inside fixed body 4 from the object lens side. Prism block 45 is placed in fixed body 4 from the object lens side in this embodiment, but the same effect can be obtained by placing it from a different direction, e.g., placing it from the top of fixed body 4.

As described above, the present invention provides very effective binoculars unseen in conventional models. Since first guide member and second guide member are attached to the fixed lens mount, and the cover member that hides the space between the left and right lens mounts when the movable lens mount has been moved away is constructed such that it moves together with the movable lens mount along the second guide member while the cover member is attached to the movable lens mount such that the cover member has some play within a certain range, when external force is applied to the cover member that appears on the outside, the external force is absorbed by the second guide member that supports the cover member, and consequently the optical system that pertains to the optical axis is protected by the second guide member.

In addition, since the movable lens mount is 'floating' relative to the cover member, external force is not easily transmitted to the optical system inside, and this makes the optical axis very stable. When not in use, the binoculars can be made compact and reduced in size. Furthermore, the number of components is smaller than conventional models. Since one of the lens mounts is fixed while only the other lens mount is movable, accuracy is more easily achieved.

Moreover, the present invention provides binoculars in which small size and compactness are realized because the focusing mechanism is situated between the left and right lens mounts and the object lens holders of the left and right lens mounts are moved along the optical axes by operating this focusing mechanism, and the image reversing prisms placed inside the left and right lens mounts include roof prisms, wherein said image reversing prisms are located so that the roof prisms face each other and guide shafts that guide the object lens holders along the optical axes are located in the space created by the slanted surfaces of the roof prisms.

Further, because the placement of guide shafts in the space created by the slanted surfaces of the roof prisms inevitably locates the rotation prevention shafts on the outside, the width of the binoculars can be reduced, and the placement of the guide shafts on the inside reduces rattling and helps the object lens holder to move smoothly.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. Binoculars comprising:
    a fixed lens mount;
    a first guide attached to said fixed lens mount;
    a second guide attached to said fixed lens mount;
    a movable lens mount linearly movable with guidance of said first guide in a direction toward or away from said fixed lens mount; and
    a cover member for concealing a space formed between said fixed lens mount and movable lens mount by movement of said movable lens mount, said cover member being movable relative to said movable lens mount and also being movable with guidance of said second guide together with said movable lens mount toward or away from said fixed lens mount.

2. The binoculars as claimed in claim 1, wherein said second guide includes a plurality of boards.

3. The binoculars as claimed in claim 1, wherein said first guide includes a shaft to which said movable lens mount is slidably engaged.

4. The binoculars as claimed in claim 3, wherein said shaft included in said first guide is located at the eyepiece side of the binoculars.

5. Binoculars comprising:
    a fixed lens mount;
    a pair of guide boards attached to said fixed lens mount;
    a movable lens mount slidable between said guide boards in a direction toward or away from said fixed lens mount; and
    a cover member for concealing a space formed between said fixed lens mount and movable lens mount in accordance with a moving state of said movable lens mount, said cover member being guided by said guide boards together with the movement of said movable lens mount.

6. The binoculars as claimed in claim 5 further comprising a guide shaft attached to said fixed lens mount and engaging with said movable lens mount to slidably guide said movable lens mount.

7. The binoculars as claimed in claim 5, wherein said cover member is arranged to have some play with respect to the movable lens mount within a certain range.

8. Binoculars comprising:

a pair of lens mounts;

an object lens holder provided in each lens mount to hold an objective lens therein, a focusing system provided between said lens mounts for focusing by moving each object lens holder in a direction of an optical axis;

an erect prism unit provided in each lens mount and including a roof prism; and a guide shaft for guiding said object lens holder in a direction of the optical axis, the guide shaft being located in a space formed within the lens mount by an inclined surface of the roof prism.

9. The binocular as claimed in clam 8, wherein each roof prism is arranged at an inner side of each lens mount so that the inclined surfaces face each other.

10. The binoculars as claimed in claim 9 further comprising a rotational prevention shaft in each lens mount which engages with each object lens holder on the other side of said roof prism from said guide shaft.

11. The binoculars as claimed in claim 10, wherein each guide shaft and rotational prevention shaft are positioned in a range of a height of the respective objective lens.

12. Binoculars, comprising:

a right optical element;

a left optical element;

a right support member for supporting said right optical element;

a left support member for supporting said left optical element;

an upper base plate for supporting said right support member to allow said right support member to move with respect to said upper base plate;

a lower base plate for supporting said left support member to allow said left support member to move with respect to said lower base plate;

a first cover member for covering said upper base plate and said lower base plate; and a second cover member for covering said upper base plate and said lower base plate.

13. The binoculars as claimed in claim 12, wherein said first cover member has a front wall, a rear wall, an upper wall, a lower wall, and a right wall, and wherein said second cover member has a front wall, a rear wall, a upper wall, a lower wall, and a left wall.

14. The binoculars as claimed in claim 12, wherein said first cover member is fixed to said upper base plate and said lower base plate, and wherein said second cover member supports said upper base plate and said lower base plate such that said second cover member is movable relative to said upper base plate and said lower base plate.

15. The binoculars as claimed in claim 12, wherein said right support member supports said right optical element such that said right optical element is movable relative to said right support member in a direction of the optical axis of said right optical element, and wherein said left support member supports said left optical element such that said left optical element is movable relative to said left support member in a direction of the optical axis of the left optical element and in a direction perpendicular to said optical axis of said left optical element.

16. The binoculars as claimed in claim 12, wherein said cover members are arranged to form a space between said cover members and said left optical element.

17. The binoculars as claimed in claim 12, wherein said cover members are fixed to said optical elements in a direction perpendicular to the optical axis of said left optical element.

18. The binoculars as claimed in claim 17, further comprising a fixing member which fixes said cover members to said optical elements.

19. The binoculars as claimed in claim 18, wherein said fixing member comprises a screw and a spring.

20. Binoculars comprising:

a fixed lens mount;

a guide shaft attached to said fixed lens mount;

a second guide attached to said fixed lens mount;

a movable lens mount slidably engaged with said guide shaft and linearly movable with guidance of said guide shaft in a direction toward or away from said fixed lens mount; and a cover member for concealing a space formed between said fixed lens mount and movable lens mount by movement of said movable lens mount, said cover member being movable relative to said movable lens mount and also being movable with guidance of said second guide together with said movable lens mount.

* * * * *